United States Patent [19]

Haglund et al.

[11] 3,964,405

[45] June 22, 1976

[54] PERENNIAL WEED CONTROL BY DEEP PLACEMENT OF VOLATILE SOIL FUMIGANTS

[76] Inventors: William A. Haglund, P.O. Box 693, Mount Vernon, Wash. 98273; Theodore P. Reiling, 500 Boright Apt. 101, Le Sueur, Minn. 56058

[22] Filed: Mar. 5, 1971

[21] Appl. No.: 121,576

[52] U.S. Cl. .......................................... 111/6; 47/58
[51] Int. Cl.² .......................................... A01C 23/02
[58] Field of Search .............................. 111/1, 6–7; 47/58

[56] References Cited
UNITED STATES PATENTS

| | | | |
|---|---|---|---|
| 2,424,520 | 7/1947 | Tonkin | 47/58 |
| 2,448,265 | 8/1948 | Kagy et al. | 47/58 |
| 2,473,984 | 6/1949 | Bickerton | 111/7 UX |
| 3,146,740 | 9/1964 | Phillips | 111/7 |
| 3,184,891 | 5/1965 | Frantzen | 47/58 |
| 3,581,685 | 6/1971 | Taylor | 111/7 |

FOREIGN PATENTS OR APPLICATIONS 949,098   2/1964   United Kingdom

*Primary Examiner*—Robert E. Bagwill
*Attorney, Agent, or Firm*—Roy E. Mattern, Jr.

[57] ABSTRACT

Perennial weeds are controlled by deeply placing selected volatile chemical soil fumigents, 14 to 24 inches below ground level, at 18 to 30 inches of horizontal spacing, and applied at rates ranging between 2.5 to 30 gallons per acre, to destroy their vegetative and reproductive roots. Examples of such perennial weeds that are effectively and economically controlled and/or eliminated are morning glory, which is also called field bindweed or Convolvulus arvensis and Canadian thistle, which is also called Cirsium arvense. Examples of the volatile soil fumigants are respectively: 1–3 dichloropropene and related chlorinated C 3 hydrocarbons containing fumigants known by various marketing names and symbols, such as Telone, Vidden-D DD, 1–3 D, and Vorlex; Methyl bromide contaning fumigants known as M. B.; and/or ethylene dibromide containing fumigants known as E.D.B. Deep placement is undertaken: by operation of spot penetrating injectors; through operating furrowing equipment; and by utilization of tooth or chisel appliators that are attached to tractor mounted cultivators or trailer type cultivators.

13 Claims, No Drawings

PERENNIAL WEED CONTROL BY DEEP PLACEMENT OF VOLATILE SOIL FUMIGANTS

BACKGROUND OF THE INVENTION

Perennial weeds, such as morning glory, also known as field bindweed, have not been adequately controlled and millions of acres of fertile farm land are severely infected. Residual herbicides and persistant soil sterilants have been used through application to foliage, soil surfaces and shallow incorporation into soil. However, the application costs have been high and adequate control has not been achieved. Moreover, there are disadvantages, such as: residual chemicals remain in the soil; there are partial losses of one or more crops, due to toxic chemicals; there is the potential of chemical residue contamination in successive food crops; and there is the possibility of the unwanted movement of the toxic entity of chemicals to other areas by leaching and/or surface run-off in natural water. In general, the application of any residual chemical to soil or foliage has the inherent danger of polluting the environment through contamination of ground and surface water. As a result, restrictions have been placed on the current usage of many chemicals formerly used in gaining some control over morning glory, Canadian thistle and other perennial weeds. This invention therefore is directed to effectively controlling and often eliminating the growth of these perennial weeds, while avoiding the unwanted after effects and complying with the directives of government agencies.

SUMMARY OF INVENTION

Many destructive perennial weeds, well identified for many years, can be kept under control and often eliminated by utilizing chemicals also known for many years. These known chemicals are now employed in different mixtures, different combination, at different rates, applied in different ways and in different locations. For example, morning glory, also known as field bindweed or *Convolvulus arvensis*, and Canadian thistle also known as *Cirsium arvense*, are both controlled and often eliminated by the deep placement of volatile, non-persistant chemical soil fumigants. The latter are fumigants containing: 1,3 dichloropropene and related chlorinated C 3 hydrocarbons, methyl bromide and/or ethylene dibromide. These chemicals are placed from 14 to 24 inches below ground level at 18 to 30 inches of horizontal spacing and applied at rates ranging between 2.5 to 30 gallons per acre. Their deep placement is accomplished: by using spot penetration injectors; through operating special furrowing equipment; and by utilization of tooth or chisel applicators generally attached to cultivators.

DESCRIPTION OF THE INVENTION

Deep direct placement of soil fumigants 16 to 24 inches below the surface is undertaken to eradicate, from the lower soils, the roots and stems of perennial weeds such as: Canadian thistle known also as *Cirsium arvensis*, and morning glory known also as field bindweed or *Convolvulus arvense*. The deep placement occurs upon operating spot penetrating injectors, special furrowing equipment; and tooth or chisel applicators generally attached to cultivators. The soil fumigants injected are: 1-3 dichloropropene containing fumigants, and known by various names and designations such as Telone, Vidden-D, DD, 1-3 D, and Vorlex; methyl bromide containing fumigants and known as MB; and/or ethylene dibromide containing fumigants and known as EDB.

EXAMPLES OF EFFECTIVE CONTROLS

EXAMPLE I

The following table summarizes the application of various types of soil fumigants containing 1-3 dichloropropene to morning glory also called field bindweed and Convolvulus arvensis contained in plastic soil tubes, at a temperature of 68° F for a 14 day period. The rate of application was based on 0.0869 ml per cubic foot of soil or expressed as 1 gallon per acre. The live root weights are the actual weights of the live roots at locations respectively of 6 and 12 inches from the specific point of the injection of the soil fumigants.

| Soil Fumigant | Rate Gal/Acre | Live root weight in grams | |
|---|---|---|---|
| | | 6" distance | 12" distance |
| | | from place of injection | |
| Control | 0 | 3.8 | 3.4 |
| Vidden-D | 3.75 | 1.4 | 3.2 |
| (50 – 60% 1,3-D) | 7.50 | 0.0 | 2.5 |
| Telone | 2.50 | 0.7 | 3.7 |
| (80% 1,3-D) | 3.75 | 0.6 | 2.3 |
| | 7.50 | 0.0 | 1.7 |
| 1, 3-D | 3.75 | 0.2 | 1.3 |
| (90% analysis) | 7.50 | 0.0 | 0.9 |

EXAMPLE II

The following tables summarize the application of various soil fumigants to morning glory, also called field bindweed and Convolvulus arensis. The soil fumigants were DD which is 1-3 dichloropropene plus C-3 hydrocarbons, EDB which is ethylene dibromide, and 1-3D which is 1-3 dichloropropene, a 90% analysis. The soil fumigants were applied in plastic soil tubes and were effective as the temperature remained at 68° F. In the first table, the live root tissue weights were observed after 44 days of exposure, and in the second table, the live root tissue weights were observed after 30 days of exposure.

| Soil Fumigant | 44 days of exposure | | |
|---|---|---|---|
| | Rate Gal/Acre | Live root weight in grams | |
| | | 6" distance | 12" distance |
| | | from place of injection | |
| Control | 0 | 14.3 | 13.6 |
| DD | 7.5 | 4.7 | 9.2 |
| | 15.0 | 2.8 | 6.9 |
| DD plus EDB | 7.5 | 1.0 | 6.1 |
| (17 plus 3)** | 15.0 | 2.2 | 2.8 |
| EDB 18/lbs gal. | 2.5 | 2.2 | 6.4 |
| 1,3-D | 8.5 | 0.3 | 3.4 |
| (90% analysis) | | | |

** Mixture of 17 parts of DD, and 3 parts of EDB at 18 pounds per gallon of active material.

| Soil Fumigant | 30 days of exposure | |
|---|---|---|
| | Rate Gal/Acre | Live root weight in grams along 18" vertical axis |
| Control | 0 | 29.3 |
| Telone | 12.5 | 2.9 |
| DD | 20 | 4.3 |
| DD + EDB (17 + 3 parts) | 20 | 3.0 |
| DD + EDB (18.5 + 1.5) | 20 | 3.0 |

-continued

| Soil Fumigant | 30 days of exposure | |
|---|---|---|
| | Rate Gal/Acre | Live root weight in grams along 18" vertical axis |
| EDB 18 lbs/gal | 2.5 | 10.7 |

EXAMPLE III

The following table summarizes the application of various soil fumigants to morning glory, also called field bindweed and Convolvulus arvensis. The soil fumigants were applied in plastic soil tubes when ambient air temperatures ranged between 35° and 60°F. for an exposure period of 42 days.

| Soil Fumigant | Rate Gal/Acre | 4" from injection point | | 7" from injection point | |
|---|---|---|---|---|---|
| | | Shoot to root ratio | % control Ck = 0% | Shoot to root ratio | % control Ck = 0% |
| DD | 5 | 13.8 | 61.6 | 17.5 | 37.1 |
| DD | 10 | 9.7 | 61.8 | 14.6 | 55.6 |
| DD | 15 | 3.4 | 96.3 | 8.7 | 63.0 |
| Telone | 5 | 8.7 | 61.6 | 16.5 | 40.8 |
| Telone | 10 | 6.3 | 80.8 | 3.5 | 92.6 |
| Telone | 15 | 0.0 | 100.0 | 2.6 | 92.6 |
| MB | 5 | 5.7 | 96.3 | 10.4 | 74.1 |
| Control | 0 | 24.3 | 0.0 | 22.5 | 0.0 |

EXAMPLE IV

The following table summarizes the application of various soil fumigants to morning glory, also called field bindweed and *Convolvulus arvensis*. The soil fumigants were applied in field plots of 3000 sq. ft. Also during the year of chemical application wheat was planted and the yields were observed.

| Soil Fumigant | Rate Gal/Acre | Bindweed Colonies/Plot | | Wheat Yield |
|---|---|---|---|---|
| | | Plot 1 3000 sq. ft. | Plot 2 3000 sq. ft. | Ave. Plot 1 & 2 Bushels/Acre |
| Control | 0 | 89 | 46 | 73.6 |
| 1-3D-Telone | 15 | 8 | 0 | 76.7 |
| 1-3D-Telone | 25 | 1 | 2 | 76.0 |
| 1-3D-DD | 15 | 2 | 12 | 76.0 |
| 1-3D-DD | 25 | 2 | 26 | 76.0 |

EXAMPLE V

The following table summarizes the application of various soil fumigants to morning glory, also called field bindweed and *Convolvulus arvensis*. The soil fumigants were applied deeply in plots of 1,800 sq. ft. at horizontal spacings of 30 inches and in other plots of 1,800 sq. ft. at horizontal spacings of 20 inches. The soil fumigants, by using a shank implement, were injected 16 inches deep below the surface of the soil.

| Soil Fumigant | Rate Gal/Acre | Horizontal Spacing | Bindweed Colonies/Plot |
|---|---|---|---|
| Vidden-D | 15 | 30 | 23 |
| Vidden-D | 15 | 20 | 13 |
| Vidden-D | 25 | 30 | 12 |
| Vidden-D | 25 | 20 | 3 |
| Control | 0 | 20 | 25 |

SUMMARY OF ADVANTAGES OF INVENTION

Perennial weeds and especially the very damaging ones commonly known as morning glory and Canadian thistle are controlled and often eliminated by deeply placing volatile chemical soil fumigants 14 to 24 inches below ground level at 18 to 30 inches of horizontal spacing and applied at rates ranging between 2.5 to 30 gallons per acre to destroy their vegetative and reproductive roots. Volatile chemicals injected are soil fumigants containing respectively: 1–3 dichloropropene, methyl bromide, and/or ethylene dibromide. Deep placement and injection is undertaken by operation of: spot penetrating injectors; furrowing equipment; tooth or chisel applicators attached to tractor mounted cultivators and trailer-type cultivators.

The control and/or elimination of these perennial weeds is undertaken economically and without creating undesirable side effects. The deep injection places the fumigants so they cannot emerge or be leached, and then be carried by surface or ground water. Also the chances of the fumigants being carried away as vapor is very unlikely after their deep injection. Any possible emergence, would involve a low concentration of a fumigant which has been very well broken down. After five to seven days the fumigant is no longer detected above the surface and there are no long term pollution effects. Often times the productivity of the resulting cleared cultivated land is increased.

We claim:

1. A method of controlling deep rooted perennial weeds such as bind-weed and Canadian thistle by the deep injection of volatile soil fumigants at least fourteen inches below the soil surface at a horizontal spacing under thirty inches and at least at a rate of two and one half gallons per acre.

2. A method of controlling deep rooted perennial weeds such as bind-weed and Canadian thistle, as claimed in claim 1, wherein 1–3 dichloropropene is injected.

3. A method of controlling deep rooted perennial weeds such as bind-weed and Canadian thistle, as claimed in claim 1, wherein 1–3 dichloropropene and related C 3 chlorinated hydrocarbons are injected together as the soil fumigants.

4. A method of controlling deep rooted perennial weeds such as bind-weed and Canadian thistle, as claimed in claim 1, wherein methyl bromide fumigants are injected.

5. A method of controlling deep rooted perennial weeds such as bind-weed and Canadian thistle, as claimed in claim 1, wherein ethylene dibromide fumigants are injected.

6. A method of controlling deep rooted perennial weeds such as bind-weed and Canadian thistle, as claimed in claim 1, wherein 1-3 3 dichloropropene and methyl bromide fumigants are injected together as the soil fumigants.

7. A method of controlling deep rooted perennial weeds such as bind-weed and Canadian thistle, as claimed in claim 1, wherein 1-3 dichloropropene and ethylene dibromide fumigants are injected together.

8. A method of controlling deep rooted perennial weeds such as bind-weed and Canadian thistle, as claimed in claim 1, wherein 1-3 dichloropropene, methyl bromide and ethylene dibromide fumigants are injected together.

9. A method of controlling deep rooted perennial weeds such as bind-weed and Canadian thistle, as claimed in claim 1, wherein deep injection occurs in a range of fourteen to twenty four inches below the soil surface.

10. A method of controlling deep rooted perennial weeds such as bind-weed and Canadian thistle, as claimed in claim 1, wherein deep injection occurs at horizontal spacings in a range of sixteen to thirty inches.

11. A method of controlling deep rooted perennial weeds such as bind-weed and Canadian thistle, as claimed in claim 1, wherein deep injection occurs at rates in a range of two and one half to thirty gallons per acre.

12. A method of controlling deep rooted perennial weeds such as bind-weed and Canadian thistle, as claimed in claim 1, wherein the injection occurs in a range of fourteen to twenty four inches below the soil surface, at horizontal spacings in a range of sixteen to thirty inches, and at a rate in a range of two and one half to thirty gallons per acre.

13. A method of controlling deep rooted perennial weeds such as bindweed and Canadian thistle, as claimed in claim 12, wherein the volatile soil fumigants are selected from the group consisting of 1-3 dichloropropene, methyl bromide, and ethylene dibromide and mixtures of the foregoing.

* * * * *

REEXAMINATION CERTIFICATE (568th)

United States Patent [19]

Haglund et al.

[11] B1 3,964,405
[45] Certificate Issued    Sep. 23, 1986

[54] PERENNIAL WEED CONTROL BY DEEP PLACEMENT OF VOLATILE SOIL FUMIGANTS

[76] Inventors: William A. Haglund, P.O. Box 693, Mount Vernon, Wash. 98273; Theodore P. Reiling, 500 Boright Apt. 101, Le Sueur, Minn. 56058

Reexamination Request:
No. 90/000,055, Aug. 14, 1981

Reexamination Certificate for:
Patent No.: 3,964,405
Issued: Jun. 22, 1976
Appl. No.: 121,576
Filed: Mar. 5, 1971

[51] Int. Cl.$^4$ .......................... A01C 23/02
[52] U.S. Cl. .......................... 111/6; 47/58
[58] Field of Search .................. 111/1, 6–7; 47/58

[56] References Cited

U.S. PATENT DOCUMENTS

| | | | |
|---|---|---|---|
| 2,424,520 | 7/1947 | Tonkin | 47/58 |
| 2,435,204 | 2/1948 | Davidson | 167/45 |
| 2,448,265 | 8/1948 | Kagy et al. | 47/58 |
| 3,133,857 | 5/1964 | Swezey | 167/39 |

OTHER PUBLICATIONS

"Carbon Disulfide for the Eradication of Perennial Weeds," Charles F. Rogers et al., Bull. 347, May 1929, Colorado Expt. Sta. pp. 1, 6, 15, 16, 21–23, and Summary.
"The Use of Tetrachloroethane in the Eradication of the European Bindweed," A. L. Bakke, J. Am. Soc. Agronomy, 33, 759–761 (1941).
"Herbicidal Use of Carbon Disulfide," H. A. Hannesson et al., Bull. 693, Oct. 1945, Univ. of California Agric. Expt. Sta., pp. 1–57.
"Soil Fumigants for Weed Control," Virgil H. Freed, Circular of Information No. 403, Agric. Expt. Sta., Oregon State College, Feb. 1947, pp. 1–4.
Principles of Weed Control, G. H. Ahlgren et al., John Wiley & Sons, New York, 1951, pp. 69, 70.
"Vidden D, A New Soil Fumigant," F. W. Fletcher, Down to Earth 15, No. 3, 16 (1959).
"Factors Influencing Diffusion and Nematode Control by Soil Fumigants," C. A. I. Goring, ACD Information Bull. No. 110, Nov. 29, 1957.
"Late Fall Application of Fumigants for the Control of Sugar Beet Nematodes, Certain Soil Fungi and Weeds," Jack Altman et al., Plant Disease Reporter 44, No. 11, 868–871 (1960).
"Theoretical Considerations of Several Factors Influencing the Effectivity of Soil Fumigants Under Field Conditions," John B. Hemwall, Soil Science 90 No. 3, 157, 167, 168 (1960).
"Diffusion and Nematode Control by 1,2-Dibromoethane, 1,3-Dichloropropene, and 1,2-Dibromo-3-Chloropropane in Soil," C. R. Youngson et al., Nematode Control, Soil Science, vol. 93, pp. 306–316 (1962).
Weed Control, chapt. "Temporary Soil Sterilants of a Volatile Nature", A. S. Crafts et al., McGraw–Hill, New York (1962), pp. 392–393.
"Penetration of Nematocides for Control of Radopholus similis and for Destruction of Citrus Roots in the Deep Sands of Central Florida," R. J. Collins et al., Phytopathology 55, Oct. (1965), pp. 1103–1107.
"Injection Depth–Important in Soil Fumigation in Rhodesia," R. A. C. Daulton, Down to Earth, 22, Spring (1967) pp. 20–21.
Soil Fumigation Also Controls Quackgrass," George E. Carter, Down to Earth, 22, Winter (1967), pp. 16–18.
"Soil Fumigation Control of Phymatotrichum Root Rot in Nevada," S. D. Lyda et al., Plant Disease Reporter, 51, No. 5 (1967), pp. 331–333.
Weed Control, vol. 2, National Academy of Sciences, Washington, D.C. (1968), pp. 238, 239.
"Improved Soil Fumigant Utilization Through Deep Placement," H. W. Lembright et al., Down to Earth 23, Summer (1968), pp. 10–12.
"Control of Field Bindweed with Methyl Bromide," R. M. Adamson, Down to Earth, 12 Winter, 12 (1956).
Brochure: "Methyl Bromide Soil Treatment", Neil A. Maclean Co, Inc., San Francisco 1953, pp. 1–16 and frontispiece.
Use of Nonselective and Mixtures of Selective Pesticides for Multiple Pest Control" Bill B. Brodie, Phytopathology, vol. 60; pp. 12–15 (Jan. 1970).

*Primary Examiner*—Robert E. Bagwill

[57] ABSTRACT

Perennial weeds are controlled by deeply placing selected volatile chemical soil fumigents, 14 to 24 inches below ground level, at 18 to 30 inches of horizontal spacing, and applied at rates ranging between 2.5 to 30 gallons per acre, to destroy their vegetative and reproductive roots. Examples of such perennial weeds that are effectively and economically controlled and/or eliminated are morning glory, which is also called field bindweed or Convolvulus arvensis and Canadian thistle, which is also called Cirsium arvense. Examples of the volatile soil fumigants are respectively: 1-3 dichloropropene and related chlorinated C 3 hydrocarbons containing fumigants known by various marketing names and symbols, such as Tellone, Vidden-D DD, 1-3 D, and Vorlex; Methyl bromide containing fumigants known as M. B.; and/or ethylene dibromide containing fumigants known as E.D.B. Deep placement is undertaken: by operation of spot penetrating injectors; through operating furrowing equipment; and by utilization of tooth or chisel applicators that are attached to tractor mounted cultivators or trailer type cultivators.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-13 are cancelled.

New claims 14-19 are added and determined to be patentable.

14. A method of controlling deep-rooted perennial weeds, such as field bindweed and Canada thistle, comprising:

penetrating the soil to be treated to a depth of at least 14 and up to 24 inches below the soil surface at horizontal spacings ranging from 16 to 30 inches with spaced implements secured for movement through the soil; and injecting a volatile soil fumigant selected from the group consisting of 1,3 dichloropropene, methylbromide, ethylene bromide and mixtures of the foregoing through the implements into the soil at depths of at least 14 and up to 24 inches below the soil surface and a rate of 2½ to 30 gallons per acre while moving the implement through the soil of the area to be treated.

15. The method of claim 14 wherein 1,3-dichloropropene is injected.

16. The method of claim 14 wherein methylbromide is injected.

17. The method of claim 14 wherein ethylenedibromide is injected.

18. The method of claim 14 wherein 1,3-dichloropropene and methylbromide are injected together.

19. The method of claim 14 wherein 1,3-dichloropropene and ethylene bromide are injected together.

* * * * *

REEXAMINATION CERTIFICATE (714th)
United States Patent [19]
Haglund et al.

[11] B2 3,964,405
[45] Certificate Issued        Jul. 7, 1987

[54] PERENNIAL WEED CONTROL BY DEEP PLACEMENT OF VOLATILE SOIL FUMIGANTS

[76] Inventors: William A. Haglund, P.O. Box 693, Mount Vernon, Wash. 98273; Theodore P. Reiling, 500 Boright, Apt. 101, Le Sueur, Minn. 56058

Reexamination Request:
No. 90/000,824, Jul. 22, 1985

Reexamination Certificate for:
Patent No.:   3,964,405
Issued:       Jun. 22, 1976
Appl. No.:    121,576
Filed:        Mar. 5, 1971

Reexamination Certificate B1 3,964,405 issued Sep. 23, 1986.

[51] Int. Cl.$^4$ ............................................ A01C 23/02
[52] U.S. Cl. ............................................ 111/6; 47/58
[58] Field of Search ............................ 111/6, 7; 47/58

[56] References Cited

PUBLICATIONS

Principles of Plant and Animal Pest Control (PPAPC), vol. 2, Weed Control, pp. 238–239 and vol. 4, Control of Plant-Parasitic Nematodes, pp. 132–156. National Academy of Sciences, Washington, D.C. (1968).

"Soil Fumigation", brochure of Puregro Company (1968), 4 pp. with attached affidavit of Virgil L. Mowry, an author.

B. B. Brodie, "Use of Nonselective and Mixtures of Selective Pesticides for Multiple Pest Control", Phytopathology, vol. 60, pp. 12–15, (Jan. 1970).

Good, J. M. et al., "Evaluation of Soil Fumigants for Control of Nematodes, Weeds and Soil Fungi", Plant Disease Reporter, vol. 48, No. 3, pp. 194–199, (Mar. 1964).

Lyda, S. D. et al., "Soil Fumigation Control of Phymatotrichum Root Rot in Nevada", Plant Disease Reporter, vol. 51, No. 5, pp. 331–333, (May 1967).

Lembright, H. W. et al., "Improved Soil Fumigant Utilization Through Deep Placement", Down to Earth, pp. 10–12 (1968).

*Primary Examiner*—Robert E. Bagwill
*Attorney, Agent, or Firm*—Roy E. Mattern, Jr.

[57] ABSTRACT

Perennial weeds are controlled by deeply placing selected volatile chemical soil fumigents, 14 to 24 inches below ground level, at 18 to 30 inches of horizontal spacing, and applied at rates ranging between 2.5 to 30 gallons per acre, to destroy their vegetative and reproductive roots. Examples of such perennial weeds that are effectively and economically controlled and/or eliminated are morning glory, which is also called field bindweed or Convolvulus arvensis and Canadian thistle, which is also called Cirsium arvense. Examples of the volatile soil fumigants are respectively; 1-3 dichloropropene and related chlorinated C 3 hydrocarbons containing fumigants known by various marketing names and symbols, such as Telone, Vidden-D DD, 1-3, D, and Vorlex; Methyl bromide containing fumigants known as M. B.; and/or ethylene dibromide containing fumigants known as E.D.B. Deep placement is undertaken: by operation of spot penetrating injectors; through operating furrowing equipment; and by utilization of tooth or chisel appliators that are attached to tractor mounted cultivators or trailer type cultivators.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 14–19 is confirmed.

Claims 1–13 were previously cancelled.

14. A method of controlling deep-rooted perennial weeds, such as field bindweed and Canada thistle, comprising;

penetrating the soil to be treated to a depth of a least 14 and up to 24 inches below the soil surface at horizontal spacings ranging from 16 to 30 inches with spaced implements secured for movement through the soil; and injecting a volatile soil fumigant selected from the group consisting of 1,3 dichloropropene, methylbromide, ethylene bromide and mixtures of the foregoing through the implements into the soil at depths of a least 14 and up to 24 inches below the soil surface and at rate of 2½ to 30 gallons per acre while moving the implement through the soil of the area to be treated.

* * * * *